2 Sheets—Sheet 2.
U. T. STEWART.
Cotton-Planter
No. 65,961.  Patented June 18, 1867.
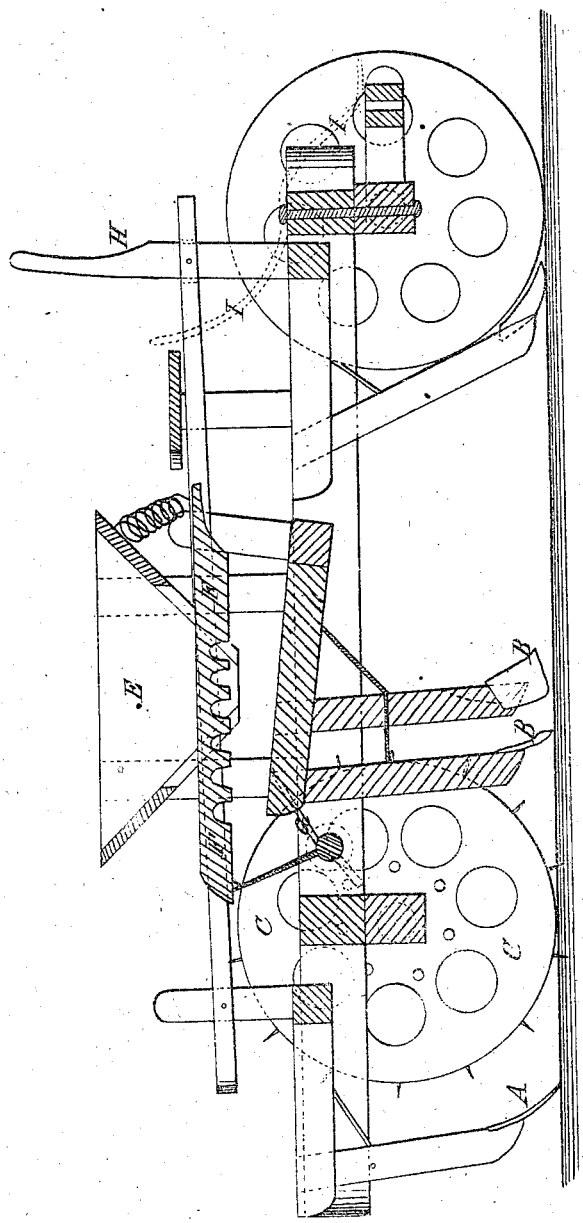

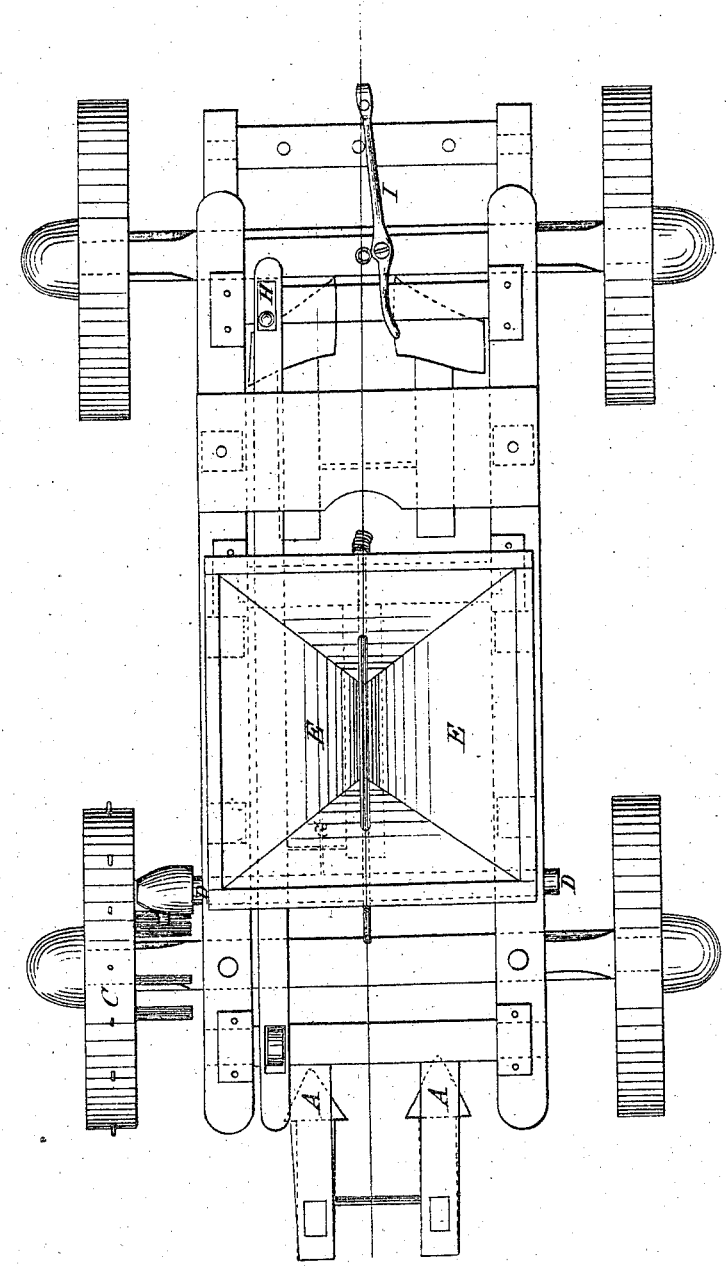

United States Patent Office

U. T. STEWART, OF FAYETTE COUNTY, TENNESSEE.

Letters Patent No. 65,961, dated June 18, 1867.

---

CULTIVATOR.

---

The Schedule referred to in these Letters Patent and making part of the same.

---

TO ALL TO WHOM THESE PRESENTS MAY COME:

Be it known that I, U. T. STEWART, of Fayette county, in the State of Tennessee, have invented a new and useful improvement in a Cotton or Corn-Cultivator, for the purpose of cultivating cotton or corn, which has not been known or used before; and I do hereby declare that the following is a full and exact description, reference being had to the accompanying drawings, and the letters of reference marked thereon, and making a part of this specification.

The nature of my invention consists in having four scrapers and two shovel-ploughs A A, all being attached together and used at the same time. Two of the scrapers are chopping scrapers, B B, and are made to chop and scrape by the revolving of one of the hind wheels C, the wheel having pins in it working against a lever attached to a shaft, D, running through the frame, the shaft having a pin attached to one side of it, which pin raises the scrapers. My cultivator opens the ridge, sows the seed, and covers it at the same time. It also thins out the cotton, scrapes it, and throws dirt to it at the same time. This cotton-cultivator has a hopper on top, E, for the purpose of holding the seed, and the seed is thrown out by a spring sword, F F, the spring sword passing through the mouth of the hopper, having teeth on the lower edge, and is moved back and forth by a spring in front, and a pin, G, in the top of the shaft, running through the frame. This machine is so constructed that a turning-plough, shovel-plough, bull-tongue, scrapers, or openers, or coverers, or harrows can be attached to it for use. Those different ploughs when attached to it are raised clear of stumps or roots by a lever in front, H. It has four wheels, and is moved by horse-power, and the whole machine is guided by a lever, I.

What I claim as my improvement, and desire to secure by Letters Patent, is—

The arrangement of the spring sword F F, and the combinations of ploughs and scrapers B B, two of the scrapers being chopping scrapers, B B, so as to perform the work above specified.

U. T. STEWART.

Witnesses:
T. B. YANCEY,
R. M. FIRTH.